United States Patent Office.

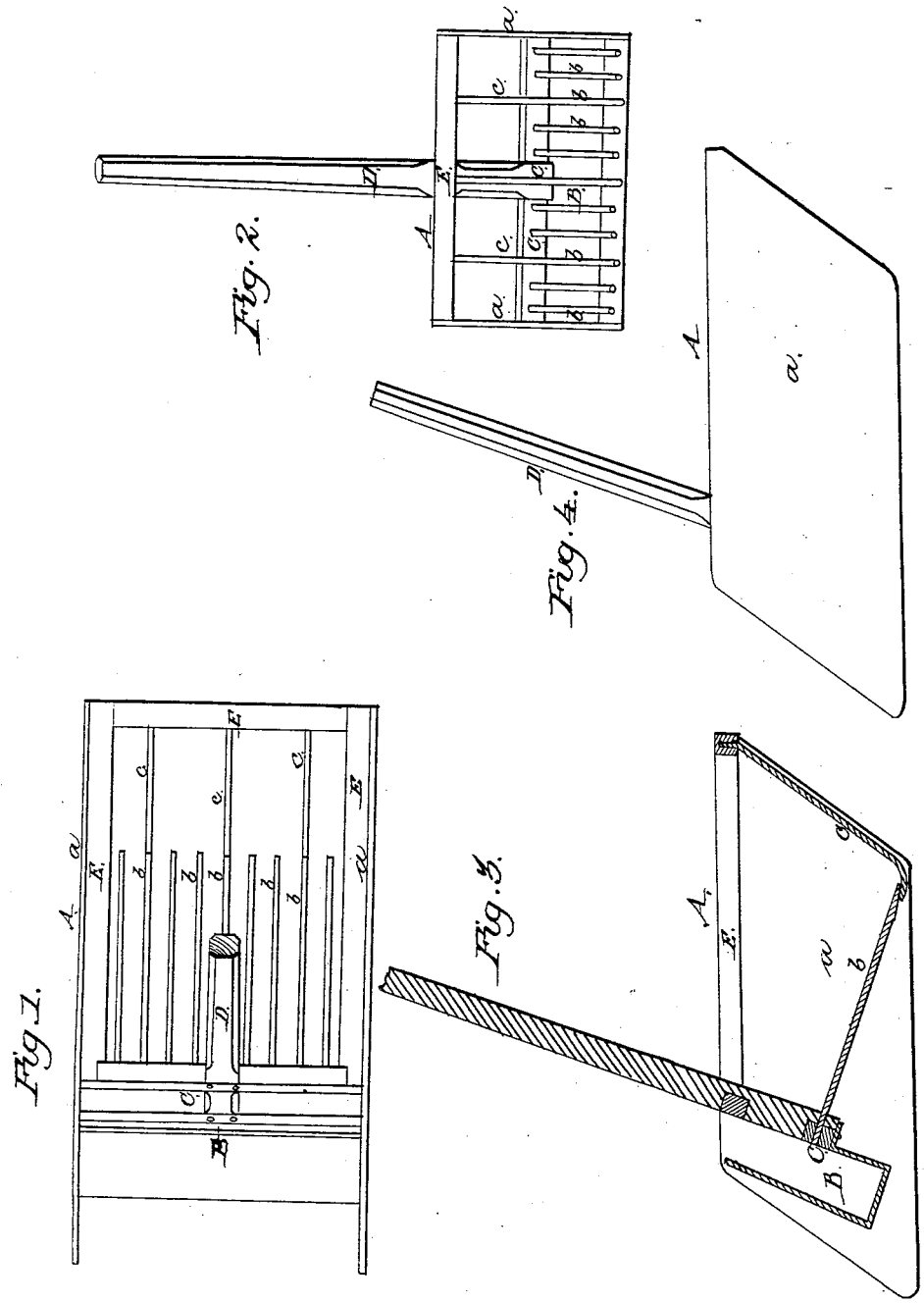

GEORGE SHOVE, OF YARMOUTHPORT, MASSACHUSETTS.

Letters Patent No. 61,476, dated January 22, 1867.

IMPROVEMENT IN CRANBERRY GATHERER.

*The Schedule referred to in these Letters Patent and making part of the same.*

TO ALL PERSONS TO WHOM THESE PRESENTS SHALL COME:

Be it known that I, GEORGE SHOVE, of Yarmouthport, in the county of Barnstable, and State of Massachusetts, have invented a new and useful or improved Cranberry Gatherer; and do hereby declare the same to be fully described in the following specification, and represented in the accompanying drawings, of which—

Figure 1 is a top view.
Figure 2, a front end elevation.
Figure 3, a longitudinal section; and
Figure 4, a side elevation of the said implement.

In such drawings, A is a box-shaped receiver or frame, whose two opposite sides, $a\ a$, are rectangular plates, there being at the rear of the receiver, a trough or receiver, B, which goes across it from side to side. Within the receiver, and extending downward at an acute angle with the plane of the bottom of its sides, $a\ a$, is a comb or series of teeth or wires, $b\ b\ b$, which are arranged at equal distances apart, and project from a cross-head or bar C. The said bar, C, is disposed in front of and above the trough, and has a handle, D, projected upward from its middle, and fastened to the rear cross-bar of a rectangular frame, E, which is arranged within and makes part of the receiver, A, in manner as shown in the drawings. From the foot of every third wire or tooth $b$ of the comb, a guard-wire, $c$, is extended upward to the front cross-bar of the frame E. These guard-wires are arranged at acute angles with the plane of the implement. It is not essential that each guard-wire should extend from every third tooth of the comb, as they may be totally disconnected from the ends of the said teeth, and be in such number as may be desirable, the object of such guard-wires being to force down the runners of the cranberry vines, and to prevent the teeth of the comb from catching into or on such runners while the cranberry gatherer may be in use.

In operating with the implement, a person, having hold of its handle, is to push the guards against and through the mass of cranberry vines. The guards will depress the runners thereof, and the comb-teeth will detach the berries from the vines, the berries being caused to pass up the comb and into the teeth. The side plates, $a\ a$, serve to prevent the berries from falling off the comb in lateral directions, and aid in guiding them into the trough, and besides, the said side plates, which are like the runners of a slide, afford a support to the implement when moved along the surface of the ground on which the cranberry vines may be, and also serve as gauges to determine the altitude of the ends of the comb-teeth and prevent them from entering the earth.

What I claim, is—

The combination as well as the arrangement of the guard-wires or guards $c\ c$, with the inclined comb or series of wires $b\ b\ b$.

I also claim the combination as well as the arrangement of the guards $c$, the inclined comb and the trough B.

I also claim the combination as well as the arrangement of the side plates $a\ a$, the comb $b\ b\ b$, the guards $c\ c$, and the trough B, the whole being substantially as hereinbefore explained.

GEO. SHOVE.

Witnesses:
R. H. EDDY,
F. P. HALE.